United States Patent [19]

May

[11] Patent Number: 4,895,323
[45] Date of Patent: Jan. 23, 1990

[54] RAG CONTROL FOR POWERED LIFT AIRCRAFT

[75] Inventor: Fred W. May, Bellevue, Wash.

[73] Assignee: The Boeing Company, Seattle, Wash.

[21] Appl. No.: 536,739

[22] Filed: Sep. 28, 1983

[51] Int. Cl.$^4$ ............................................. B64C 9/24
[52] U.S. Cl. ..................................... 244/214; 244/207
[58] Field of Search ............... 244/214, 207, 213, 199, 244/90 A

[56] References Cited

U.S. PATENT DOCUMENTS

| | | | |
|---|---|---|---|
| 1,880,019 | 9/1932 | Harper | 244/214 |
| 2,070,705 | 2/1937 | Barnhart | 244/214 |
| 2,868,480 | 1/1959 | Attinello | 244/207 |
| 2,894,703 | 7/1959 | Hazen et al. | 244/199 |
| 3,480,234 | 11/1969 | Cornish, III | 244/199 |
| 4,293,110 | 10/1981 | Middleton et al. | 244/214 |

*Primary Examiner*—Galen Barefoot
*Assistant Examiner*—Rodney Corl
*Attorney, Agent, or Firm*—Joan H. Pauly

[57] ABSTRACT

A wing (2) has a trailing edge at which jet flow is deflected downwardly to provide lift. A retractable member (4, 4') has a sharp forward edge (6, 6'). When deployed, member (4, 4') extends along at least a portion of the span (preferably substantially the entire span) of the wing (2) at the leading edge of wing (2). Member (4, 4') projects forwardly and upwardly from wing (2). Member (4, 4') causes flow around wing (2) rearwardly of itself to separate from wing (2) to reduce suction and leading edge thrust. Preferably, reattachment of flow is induced at a location spaced rearwardly from member (4, 4'). A jet of high velocity gas is blown along wing (2) in a generally spanwise direction. This induces reattachment to maintain trailing edge thrust so that jet deflection at the trailing edge will efficiently provide lift during a short distance landing.

10 Claims, 2 Drawing Sheets

RAG CONTROL FOR POWERED LIFT AIRCRAFT

TECHNICAL FIELD

This invention relates to methods and apparatus for controlling drag in powered lift aircraft during descent of the aircraft and, more particularly, to such a method and apparatus in which leading edge thrust is reduced and trailing edge thrust is maintained to efficiently provide lift during a short distance landing operation.

BACKGROUND ART

Powered lift aircraft, aircraft in which during flight a part of the sustaining lift is derived from the propulsion system, are well-known in the art. Such aircraft depend on the use of high thrust levels to generate the lift required for short distance (STOL) landings. In order for an aircraft to descend, the total force on the aircraft along an axis in the direction of the relative wind must be positive; that is, the drag must be greater than the thrust along such axis. In powered lift aircraft, the necessity for the drag to be greater than the thrust for the aircraft to descend presents a problem since it is also desirable to make maximum use of the thrust provided by the propulsion system to generate lift, which of course must always equal the weight of the aircraft when the aircraft is in the air.

Known methods and apparatus for accomplishing descent and short distance landing of powered lift aircraft when used in connection with aircraft which have jet-flap type high lift systems (which include internally blown jet flaps, augmentor wings, ejector flaps, externally blown flaps, and upper surface blowing) have been unable to take full advantage of all of the thrust provided by the propulsion system to generate lift since the aircraft could not descend when the propulsion system was set at maximum thrust. This inability to descend at full thrust is due to the phenomenon known as "jet flap thrust recovery". Suction is developed on the wing or airfoil leading edge. This suction is approximately equal to the thrust at the wing trailing edge, and its effect is to decrease the drag on the aircraft and thereby make descent more difficult. Theoretically, the suction developed is independent of the downward deflection of jet flow at the trailing edge to produce lift.

There have been a number of previous attempts to solve the problem of providing satisfactory descent performance of powered lift aircraft with jet-flap type high lift systems. These attempts have centered on reducing thrust operation of the propulsion system or decreasing the efficiency of the lift-generating jet flow deflection process at high jet deflection angles. Both of these approaches result in a relative loss in lift since the lift is less than that which could be obtained if all of the installed thrust were used efficiently to provide lift. The net result is that the slowing of the speed of the aircraft during descent is not maximized and therefore the landing distance is not minimized.

DISCLOSURE OF THE INVENTION

A subject of the present invention is apparatus in a powered lift aircraft which comprises a generally laterally extending airfoil and a retractable member. The airfoil has a trailing edge at which jet flow is deflected downwardly to provide lift. The retractable member includes a sharp edge. The retractable member has a retracted position and a deployed position. In its deployed position, the retractable member extends spanwise along at least a portion of the span of the airfoil substantially at the leading edge of the airfoil and projects forwardly and upwardly from the airfoil. The sharp edge is the retractable member's forwardmost and upwardmost edge when said member is in its deployed position. When the retractable member is in its deployed position, it causes flow around the airfoil rearwardly of itself to separate from the airfoil to reduce leading edge thrust and provide descent capability.

Preferably, the apparatus further comprises means for inducing reattachment of flow over the airfoil at a location spaced rearwardly from the leading edge of the airfoil. Said means induces reattachment of said flow to maintain the trailing edge thrust and prevent a loss in maximum lift. Thus, lift is provided efficiently during a short distance landing.

A preferred feature of the apparatus of the invention is means for inducing reattachment which comprises blowing means for blowing a jet of high velocity gas along the airfoil in a generally spanwise direction just forward of the location at which reattachment is desired.

The retractable member may take various forms. In one embodiment, the retractable member is substantially in the form of a flat plate. An alternative is to provide a retractable member that is generally wedge-shaped. Whatever the precise shape of the retractable member, in most applications the deployed retractable member preferably extends along substantially the entire span of the airfoil.

Another subject of the invention is a method of controlling drag during descent of a powered lift aircraft. According to an aspect of the invention, the method comprises deploying a member with a sharp forward edge to project forwardly and upwardly from the leading edge of a generally laterally extending airfoil along at least a portion of the span of the airfoil. This causes flow around the airfoil rearwardly of said member to separate from the airfoil to reduce leading edge thrust. Preferably, the method further comprises inducing reattachment of flow over the airfoil at a location spaced rearwardly from the leading edge of the airfoil to maintain the trailing edge thrust and prevent a loss in maximum lift obtained by jet deflection at the trailing edge of the airfoil. Also preferably, this step of inducing reattachment comprises blowing a jet of high velocity gas along the airfoil in a generally spanwise direction just forward of the location at which reattachment is desired. In most applications, it is anticipated that it will also be preferable for the member to be deployed to extend along substantially the entire span of the airfoil.

The method and apparatus of the present invention provide a means of producing descent capability in powered lift aircraft with high thrust settings. The separation of flow in the vicinity of the leading edge of the airfoil reduces the undesirable leading edge suction and thus produces a loss in leading edge thrust. The result is that the total thrust is less than the total drag and the aircraft is able to descend. The separation of flow in the area of the leading edge can create some loss in lift obtained by jet deflection at the trailing edge. However, the preferred feature of reattachment of the flow prevents such loss in lift and makes it possible for the thrust of the propulsion system to be used with maximum efficiency to produce lift at the trailing edge of the airfoil. The result is the ability to descend at a high thrust setting but slow speed and the ability to land in a very short distance.

These and other advantages and features will become apparent from the detailed description of the best modes for carrying out the invention that follows.

BRIEF DESCRIPTION OF THE DRAWINGS

In the drawings, like element designations refer to like parts throughout, and.

BEST MODES FOR CARRYING OUT THE INVENTION

Figure 1:
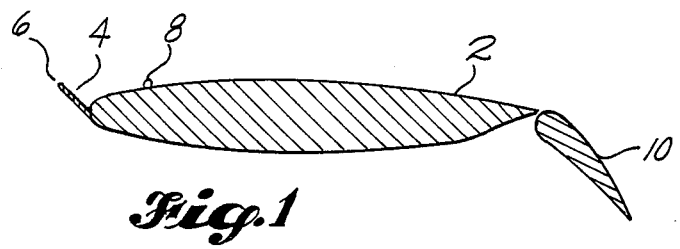
FIG. 1 is a cross-sectional view taken substantially along the line 1—1 in FIG. 3, showing a first preferred embodiment of the apparatus of the invention.

The drawings show apparatus that is constructed according to the invention and that constitutes the best modes of the apparatus of the invention currently known to the applicant. The drawings also illustrate the best mode for carrying out the method of the invention currently known to the applicant. The wing 2 shown in the drawings is only one type of airfoil to which the present invention may be applied to great advantage. It is of course to be understood that other types of airfoils over which jet flow is deflected downwardly at the trailing edge to provide lift would also benefit greatly from the application of the method and apparatus of the invention.

Figure 2:
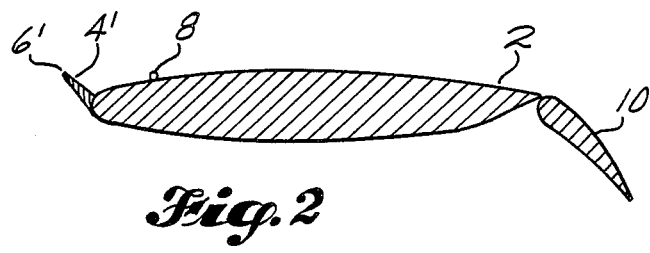
FIG. 2 is like FIG. 1 except that it shows a slightly different preferred embodiment of the apparatus of the invention.

FIG. 1 shows a first preferred embodiment of the apparatus of the invention, and FIG. 2 shows a second preferred embodiment. The apparatus in both embodiments includes a wing 2 that has a trailing edge flap 10 that is inclined downwardly to provide jet deflection at the trailing edge and thereby derive a portion of the sustaining lift from the propulsion system of the aircraft. This illustrated approach to providing powered lift for an aircraft, as well as a number of other approaches, are well-known in the art.

According to the invention, a generally laterally extending airfoil, such as the wing 2 shown in the drawings, is provided with a retractable member that has a sharp edge. The retractable member has a retracted position and a deployed position in which it projects forwardly and upwardly from the leading edge of the airfoil. In its retracted position, the member may be folded back against the upper or lower surface of the airfoil or may be positioned inside of the airfoil. There are a number of known methods for deploying a retractable member from any one of these positions. For example, the retractable member might be moved outwardly from inside of the airfoil through a slot that is closed when the retractable member is not in use or being deployed.

Figure 3:
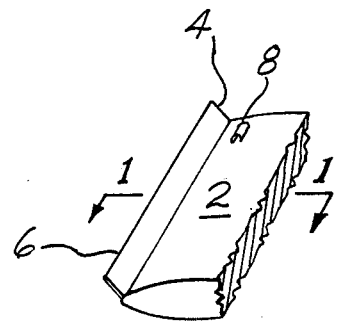
FIG. 3 is a fragmentary pictorial view of the leading edge portion of the apparatus shown in FIG. 1.

FIGS. 1 and 2 show first and second preferred embodiments of the retractable member 4, 4' in their deployed positions. Each of the members 4, 4' projects forwardly and upwardly from the wing 2 substantially at the leading edge of the wing 2. The sharp edge 6, 6' of each member 4, 4' is the forwardmost and upwardmost edge of the respective member 4, 4' when the member 4, 4' is in the deployed position shown in FIGS. 1–3. In apparatus constructed according to the invention, the retractable member extends spanwise along at least a portion of the span of the airfoil. The extent of this portion may vary considerably. However, both of the illustrated preferred embodiments of the retractable member 4, 4' extend along substantially the entire span of the wing 2, as is most clearly shown in FIG. 3.

The exact shape of the retractable member may vary considerably. The member 4 shown in FIG. 1 is substantially in the form of a flat plate 4 with a sharp forward edge 6. The member 4' shown in FIG. 2 has a greater thickness at its base and is generally wedge-shaped. The pointed end of the wedge forms the sharp forward edge 6' of the second embodiment.

The sharp forward edge of a retractable member constructed according to the invention, when the member is deployed, causes flow around the airfoil rearwardly of the member to separate from the airfoil. This separation of flow is most clearly shown in the left hand portion of FIG. 4. The separation reduces the suction in the area of the leading edge of the airfoil to thereby reduce leading edge thrust. The turbulent flow rearward of the retractable member also increases the drag on the airfoil. The decrease in thrust and the increase in drag creates the necessary relationship of greater drag than thrust so that the aircraft is able to descend.

Apparatus constructed according to the invention preferably also includes means for inducing reattachment of flow over the airfoil at a location spaced rearwardly from the leading edge of the airfoil. In the preferred embodiments of the invention, this means for inducing reattachment comprises blowing means for blowing a jet of high velocity gas along the airfoil in a generally spanwise direction just forward of the location at which reattachment is desired. Structure and procedures for providing a jet of high velocity gas along an airfoil for purposes unrelated to the present invention are well-known in the art. The jet of high velocity gas is normally provided trough one or more nozzles. The number of nozzles required would generally be determined by the length of the airfoil portion over which high velocity blowing is desired. In the preferred embodiment of the means for inducing reattachment shown in the drawings, the jet of high velocity gas is provided by a single nozzle 8 since the spanwise length of the wing 2 is relatively short.

Whatever method is used to induce reattachment of the flow rearwardly of the separation area, the reattachment of the flow makes it possible to maintain the trailing edge thrust while at the same time reducing the leading edge thrust. The maintenance of the trailing edge thrust prevents a loss in the maximum lift that may be obtained by jet deflection at the trailing edge of the airfoil. Thus, the thrust of the propulsion system is used with great efficiency to provide lift during a short distance landing.

Figure 4:
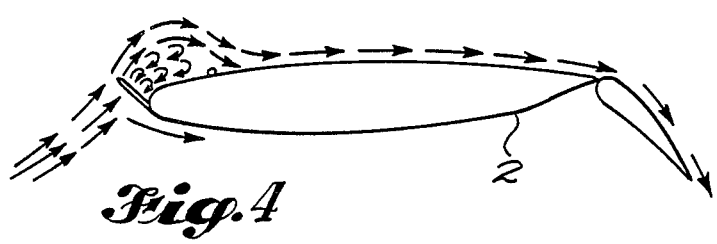
FIG. 4 illustrates the flow patterns over apparatus constructed in accordance with the first preferred embodiment shown in FIG. 1.
Figure 5:
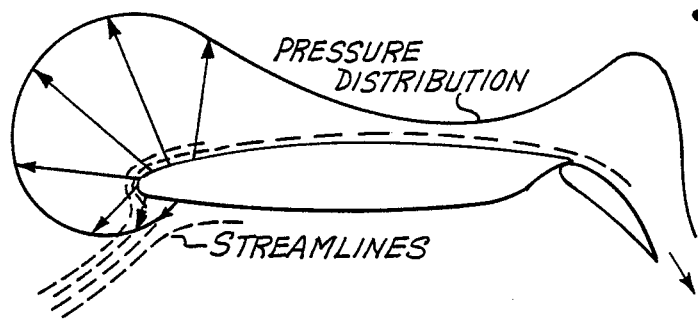
FIG. 5 shows a typical pressure distribution and typical streamlines around a conventionally equipped airfoil of the same general type shown in FIG. 1.

FIG. 4 shows the flow patterns over an airfoil equipped in accordance with the present invention. The flow is separated from the airfoil rearwardly of the retractable member and the leading edge of the airfoil, and then reattachment is induced at a location spaced rearwardly from the leading edge, creating a trapped leading edge vortex. The flow remains attached and is deflected downwardly at the trailing edge of the airfoil. FIG. 5 shows the streamlines over an airfoil without leading edge thrust control. As can be seen, the flow is attached in the leading edge region of the airfoil. Thus, suction is developed on the airfoil at the leading edge and the leading edge thrust is relatively high.

Figure 6:
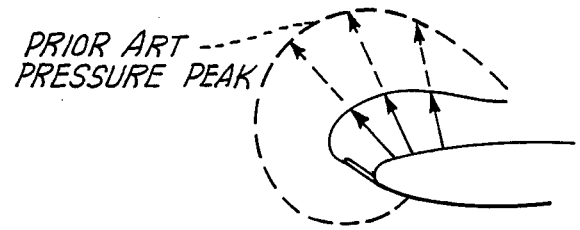
FIG. 6 illustrates the reduction in the leading edge pressure peak obtained by use of the method and apparatus of the invention.

FIG. 5 also shows a typical jet flap saddle-back type pressure distribution that results from the type of flow shown in FIG. 5. In FIG. 6, the leading edge pressure peak of the two flow situations illustrated in FIGS. 4 and 5 are shown together for purposes of comparison. The relatively large pressure peak of the typical saddle-back pressure distribution is shown in dotted lines. The relatively small pressure peak obtained by use of the method and apparatus of the present invention is shown in solid lines.

Figure 7:
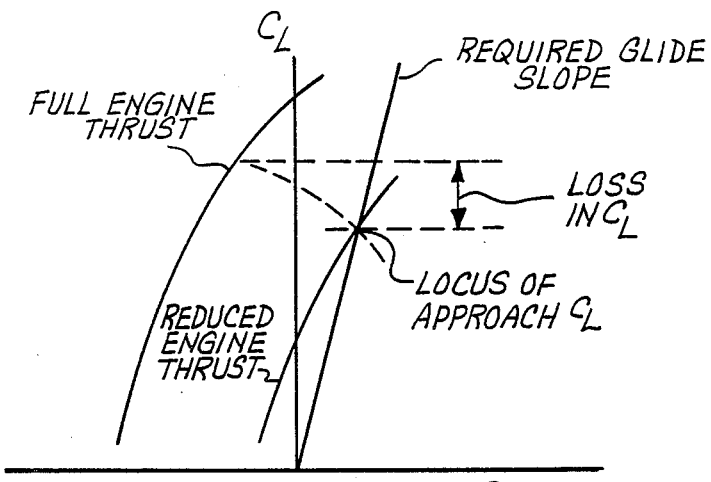
FIG. 7 is a graphical illustration of the loss in lift experienced when engine thrust is reduced to permit descent of a powered lift aircraft.

FIG. 7 illustrates the loss in lift that is experienced when engine thrust is reduced in order to provide descent capability. $C_D$ is the coefficient of drag and $C_L$ is the coefficient of lift. The quadrant on the left is the climb quadrant in which the total force on the aircraft along an axis in the direction of the relative wind is negative and the aircraft accelerates or climbs. The quadrant on the right is the descent quadrant in which the total force on the aircraft along such axis is positive to permit deceleration or descent. The curves represent the relationship between $C_D$ and $C_L$ for two engine thrust levels. As can be seen, reducing the engine thrust shifts the curve to the right. FIG. 7 clearly shows the substantial loss in $C_L$ and the loss in lift experienced when descent capability is provided by reducing engine thrust.

Figure 8:
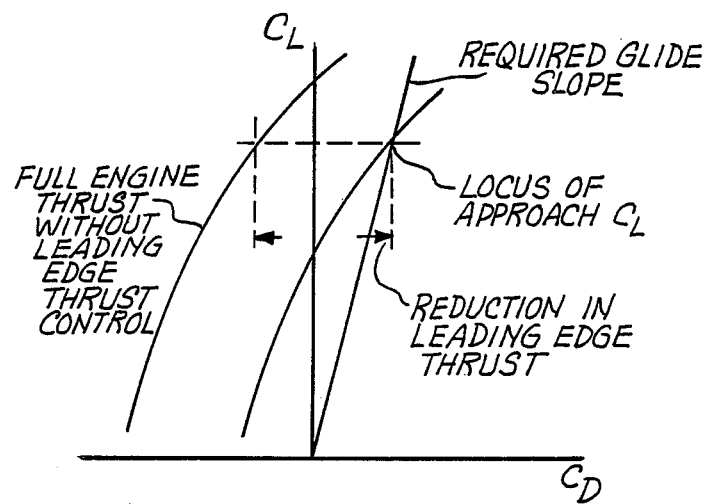
FIG. 8 is like FIG. 7 except that it illustrates the provision of descent capability in accordance with the invention by reduction in leading edge thrust.

FIG. 8 is similar to FIG. 7 except that is shows the rightward shifting of the curve into the descent quadrant by reducing the leading edge thrust, rather than reducing the engine thrust. The coefficient of lift and the lift are maintained to equal the values they have at full engine thrust without leading edge thrust control. Thus, descent capability is achieved without sacrificing the efficiency of the lift generating function of the engine thrust.

Although the preferred embodiments of the method and apparatus of the present invention have been illustrated and described, it is to be understood that various modifications may be made without departing from the spirit and scope of the present invention as defined in the following claims.

What is claimed is:

1. In an aircraft of the type in which during flight a part of the sustaining lift is derived from the propulsion system, apparatus comprising:
    a generally laterally extending airfoil with a trailing edge at which jet flow from the propulsion system is deflected downwardly to provide sustaining lift during flight; and
    a retractable member including a sharp edge and having a retracted position, and a deployed position in which it extends spanwise along at least a portion of the span of the airfoil substantially at the leading edge of the airfoil and projects forwardly and upwardly from the airfoil and in which its sharp edge is its forwardmost and uppermost edge;
    wherein when said member is in its deployed position, it causes flow around the airfoil rearwardly of itself to separate from the airfoil to reduce leading edge suction and leading edge thrust and thereby provide descent capability at a high propulsion system thrust setting but a slow aircraft speed.

2. In an aircraft of the type in which during flight a part of the sustaining lift is derived from the propulsion system, apparatus comprising:
    a generally laterally extending airfoil with a trailing edge at which jet flow from the propulsion system is deflected downwardly to provide sustaining lift during flight;
    a retractable member including a sharp edge and having a retracted position, and a deployed position in which it extends spanwise along at least a portion of the span of the airfoil substantially at the leading edge of the airfoil and projects forwardly and upwardly from the airfoil and in which its sharp edge is its forwardmost and uppermost edge; wherein when said member is in its deployed position, it causes flow around the airfoil rearwardly of itself to separate from the airfoil to reduce leading edge suction and leading edge thrust and thereby provide descent capability at a high propulsion system thrust setting but a slow aircraft speed; and
    means for inducing reattachment of airflow over the airfoil at a location spaced rearwardly from the leading edge of the airfoil and the retractable member, to maintain the trailing edge thrust when said member is deployed and is reducing leading edge thrust, to prevent a loss in maximum lift obtained by jet deflection at the trailing edge and efficiently provide lift from the propulsion system during a short distance landing.

3. Apparatus as described in claim 2, in which said means comprises blowing means for blowing a jet of high velocity gas along the airfoil in a direction generally parallel to the span of the airfoil just forward of the location at which reattachment is desired.

4. Apparatus as described in claim 1, in which the retractable member is substantially in the form of a flat plate.

5. Apparatus as described in claim 1, in which the retractable member is generally wedge-shaped.

6. Apparatus as described in claim 1, in which the retractable member in its deployed position extends along substantially the entire span of the airfoil.

7. A method of controlling drag during descent and reducing the landing distance of an aircraft of the type in which during flight a part of the sustaining lift is derived from the propulsion system, comprising deploying a member with a sharp forward edge to project forwardly and upwardly from the leading edge of a generally laterally extending airfoil along at least a portion of the span of the airfoil to cause flow around the airfoil rearwardly of said member to separate from the airfoil to reduce leading edge suction and leading edge thrust; and allowing the reduction of leading edge suction and leading edge thrust to slow the speed of the aircraft, and at the same time, maintaining the propulsion system of the aircraft at a high thrust setting to provide sustaining lift.

8. A method of controlling drag during descent and reducing the landing distance of an aircraft of the type in which during flight a part of the sustaining lift is derived from the propulsion system, comprising:

deploying a member with a sharp forward edge to project forwardly and upwardly from the leading edge of a generally laterally extending airfoil along at least a portion of the span of the airfoil to cause flow around the airfoil rearwardly of said member to separate from the airfoil to reduce leading edge suction and leading edge thrust;

allowing the reduction of leading edge suction and leading edge thrust to slow the speed of the aircraft, and at the same time, maintaining the propulsion system of the aircraft at a high thrust setting to provide sustaining lift; and deflecting downwardly at the trailing edge of the airfoil jet flow from the propulsion system to provide lift; and, while said member is deployed and leading edge suction is reduced, inducing reattachment of airflow over the airfoil at a location spaced rearwardly from the leading edge of the airfoil and said member to maintain the trailing edge thrust and prevent a loss in maximum lift obtained by such deflecting.

9. A method as described in claim 8, in which the step of inducing reattachment comprises blowing a jet of high velocity gas along the airfoil in a direction generally parallel to the span of the airfoil just forward of the location at which reattachment is desired.

10. A method as described in claim 7, in which said member is deployed to extend along substantially the entire span of the airfoil.

* * * * *